May 15, 1956     H. J. SANDS     2,745,117
BEDFRAME WITH REINFORCING CASTER PLATE MEANS THEREIN
Filed Sept. 10, 1953     2 Sheets-Sheet 1
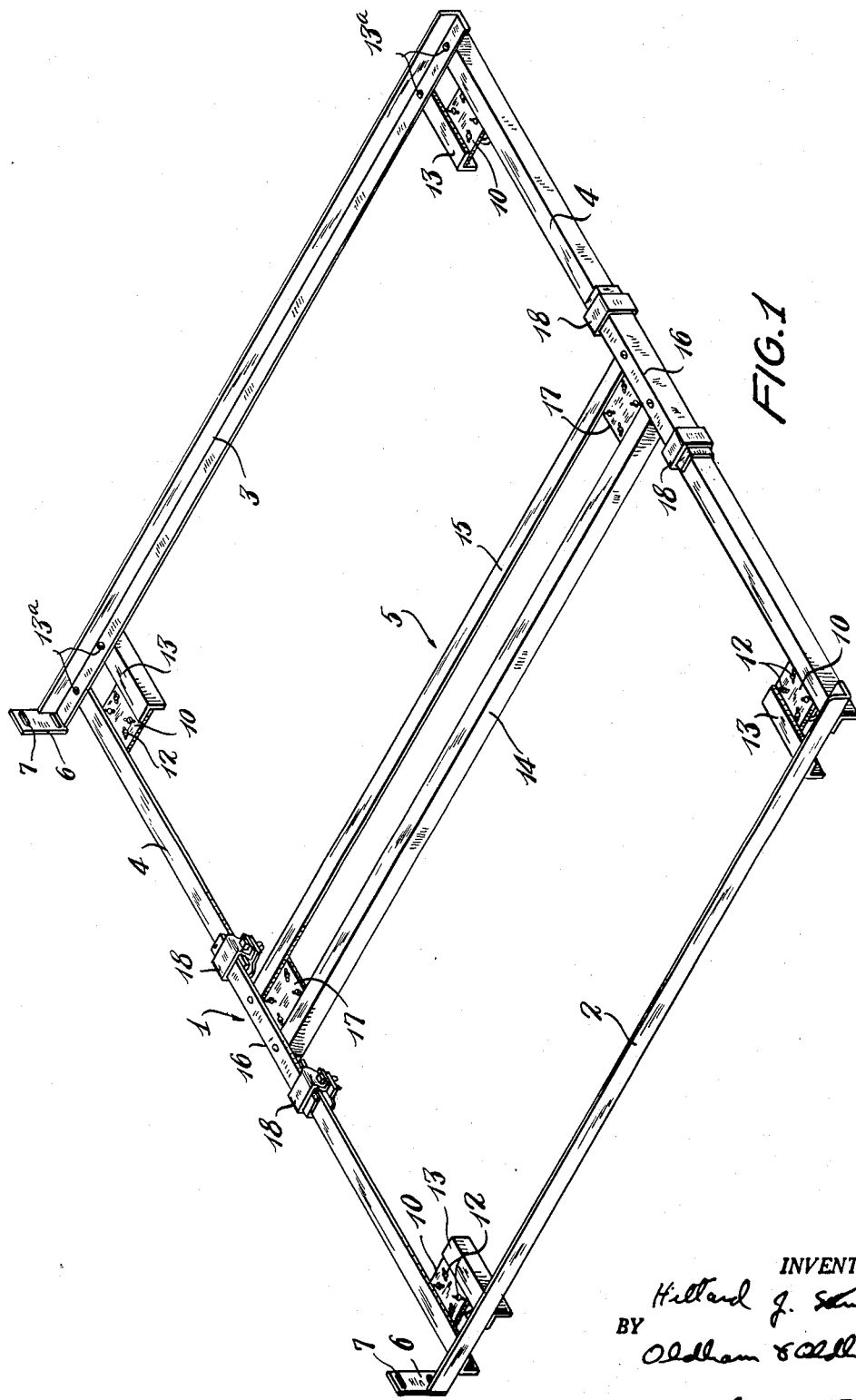

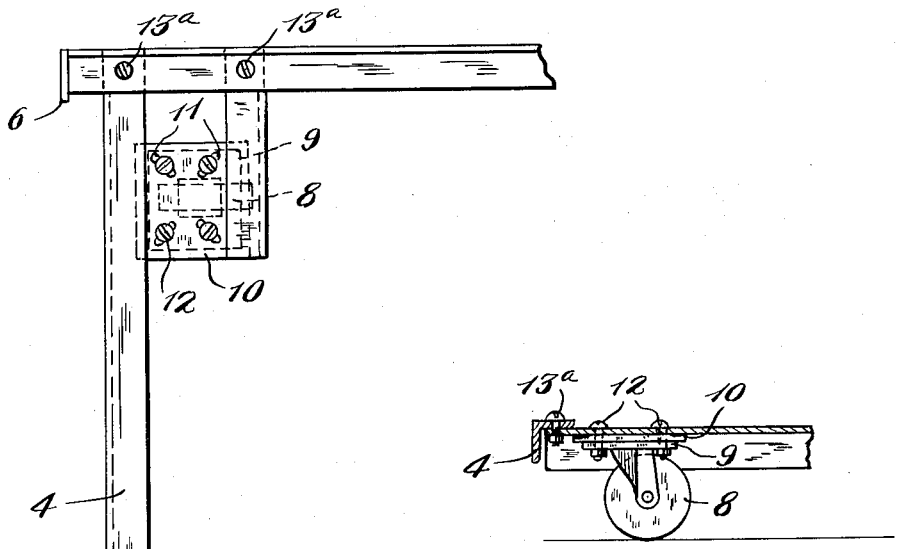
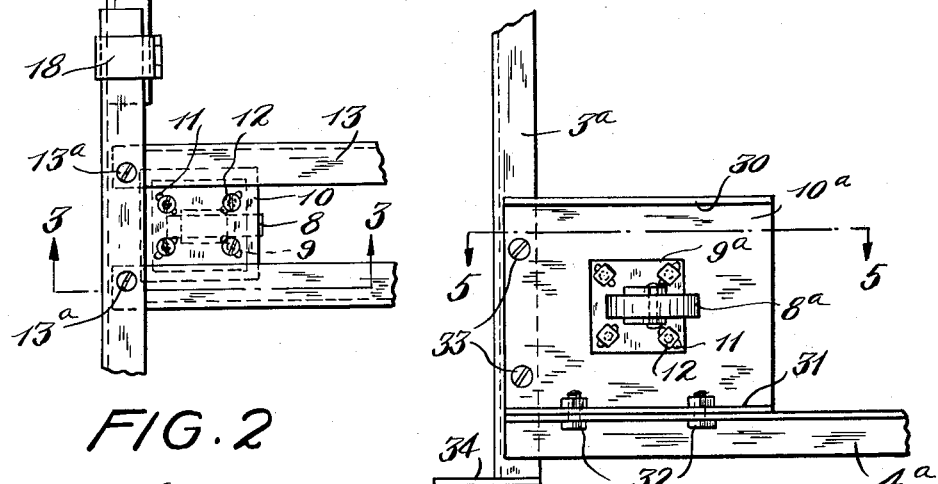
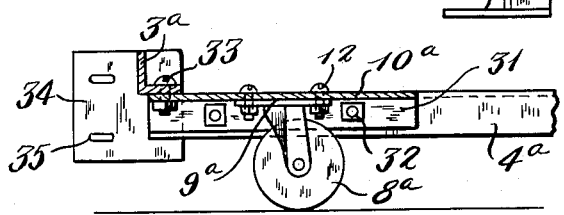

United States Patent Office 2,745,117
Patented May 15, 1956

2,745,117

BEDFRAME WITH REINFORCING CASTER PLATE MEANS THEREIN

Hillard J. Sands, Cleveland, Ohio, assignor to The Harvard Manufacturing Co., Cleveland, Ohio, a corporation of Ohio Application September 10, 1953, Serial No. 379,343

4 Claims. (Cl. 5—200)

This invention relates to bedframes, and especially to Hollywood type bedframes.

In bedframes, and especially the so-called Hollywood type of bedframes, major stresses are applied to the bedframes in the caster engaging portions of such bedframes. Usually the bedframes are made from metal angles and, of course, it is desirable to make a bedframe from a minimum weight and cost of material but with the bedframe still having desirable supporting properties and not being distortable or being easily bent out of shape by normal stresses or loads applied thereto. One further problem involved in securing casters to bedframes is that the casters sometimes are objectionable if placed at either the lateral margin or end of the bedframe.

It frequently is desirable to ship bedframes in an unassembled condition so that it is necessary that the components of the bedframe be relatively compactly made and can be easily assembled. Furthermore, sometimes such bedframes require center support means therein and again the problem of securing casters to such center support means is one which is difficult to solve by an inexpensive but sturdy type of a center support unit. Inasmuch as the bedframes may be assembled at the point of use by means of bolts or similar means, it frequently is difficult to keep such bolts from loosening in service and rendering the bedframe wobby or rattly.

Thus the general object of the present invention is to provide a new type of a bedframe especially characterized by the sturdy means used for securing casters to the bedframe.

Another object of the invention is to position caster means in inwardly spaced relationship to the lateral margins of a bedframe.

Yet another object of the invention is to provide a bedframe which can be shipped in unassembled or partially assembled condition and be readily secured together by relatively unskilled help at the point of use of the bedframe.

Another object of the invention is to provide a substantially quadrilateral reinforcing unit in a bedframe for securing casters thereto.

A further object of the invention is to provide a bedframe wherein casters having positioning plates thereon can be used for supporting both the bedframe side and cross rails and center support means for the bedframe.

A further object of the invention is to secure casters to bedframes by such means as to avoid any turning or bending moments on the bedframe components by stresses applied thereto through the casters.

A further object of the invention is to use stubby or short auxiliary cross rails in a bedframe to aid in reinforcing a bedframe at the caster engaging, major load receiving portions thereof.

The foregoing and other objects and advantages of the invention will be made more apparent as the specification proceeds.

For a better understanding of the present invention, reference should be had to the accompanying drawings, wherein one currently preferred embodiment of the invention is shown and wherein:

Fig. 1 is a perspective view of a bedframe embodying the principles of the invention;

Fig. 2 is an enlarged fragmentary plan of an end portion of the bedframe of Fig. 1;

Fig. 3 is a vertical sectional elevation taken on line 3—3 of Fig. 2.

Fig. 4 is a bottom plan of a modification of the bedframe of the invention; and

Fig. 5 is an end elevation of the bedframe of Fig. 4.

The present invention, broadly speaking, relates to a bedframe comprising a pair of side rails, cross rail means adjustably connected between the side rails adjacent the ends thereof, caster means, support plate means secured to the caster means and secured at one edge to the cross rail means, and stubby or short auxiliary support rails secured to said side rails and extending laterally inwardly thereof parallel to and spaced from the cross rail means, the auxiliary support rails being individually secured to edge portions of the support plate means to provide sturdy caster positioning means in the bedframe. Center support means having caster support plate means provided therein similar to the other support plate means of the bedframe may be provided for use with the cross rail means of the bedframe.

Attention now is directed to the details of the structure shown in the drawings, and a bedframe is indicated as a whole by the numeral 1. The bedframe 1 includes a pair of side rails 2 and 3 and the cross rail means of the bedframe 1 may be of any desired construction. However, usually substantially all of the major components of the bedframe 1 are made from metal angles and the angles are usually so positioned in the bedframe that the side rails 2 and 3, for example, have a horizontally directed laterally inner leg and a vertically upwardly directed outer leg. The cross rails in this instance comprise cross rail segments 4 each of which is suitably secured at one end to one of the side rails 2 and 3 to extend laterally inwardly therefrom. The bedframe 1 is completed by means of a center support unit indicated as a whole by the numeral 5, which center support unit engages the cross rail segments 4 in a laterally adjustable manner for supporting the center portion of any mattress or springs placed upon the bedframe 1.

Usually the bedframe 1 includes bed headboard support plates 6 that are secured, as by welding, to corresponding ends of the side rails 2 and 3. These plates 6 have horizontally directed slots 7 therein so that the bedframe 1 has width adjustability in engaging with a bed headboard.

An important feature of the present invention resides in the sturdy types of caster support means provided in the bedframe. The bedframe 1 is particularly adapted for engaging with casters to distribute the loads or support moments set up by the casters and the means used to connect the casters to the bedframe. Thus casters 8 are shown which have top plates 9 usually integrally secured to the frame means of the casters to position such casters for load support action. In order to engage the top plate 9 with the remainder of the bedframe 1, caster support plates 10 are provided in the bedframe 1 and preferably are secured, as by welding, to the lower surfaces of the horizontal legs of the cross rail segments 4 and extend longitudinally of the bedframe 1 therefrom. Normally the caster support plates 10 are laterally inwardly positioned from the side rails 2 and 3 and suitably engage the top plates 9. A plurality of converging slots 11 are provided in the caster support plates 10 for receiving bolts 12 or other suitable means for securing the top plates 9 and thereby the casters 8 to such caster support plates 10. Short or stubby auxiliary cross rails 13 are secured to the side rails 2 and 3 at one end of such auxiliary cross rails, as by bolts 13a, and extend laterally inwardly therefrom. The remaining ends of such auxiliary cross rails 13 are secured, as by welding, to portions of the caster support plates 10 in opposed relation to the portions of such support plates engaging the cross rail segments 4. Thus a quadrilateral support unit is provided, in effect, for positioning each of the casters 8 when a portion of the side rails is considered to be part of the caster positioning means. These support units provided for the casters provide very sturdy engaging means to position the casters and distribute loads applied to the top plate 9 to a relatively wide area of the bedframe. In addition, the casters 8 are not directly twisting any of the angular components of the bedframe and thus turning or twisting moments in such angles are avoided.

The center support unit 5 also uses the same type of caster support means as provided for the casters in association with the side rails 2 and 3. Thus a pair of center support rails 14 and 15 are provided in the bedframe 1. The center support rails 14 and 15 extend at least substantially the length of the bedframe 1 and terminate at center cross rails 16 that extend transversely of the bedframe 1. The center cross rails 16 are secured in any desired manner to the center support rails 14 and 15 to extend normally thereto, as shown in the drawings. Center caster support plates 17 are secured, as by welding, to the lower surfaces of the horizontal legs of the center rails 14 and 15 and with such plates 17 extending therebetween, slightly spaced from the center cross rails 16. Usually the center cross rails 16 are positioned with the horizontal legs thereof on top of the upper surfaces of the center rails 14 and 15 to make a neat smooth unit of the various components of the center support 5 and to position the horizontal legs of the center support rails 14 and 15 in at least substantial horizontal alignment with the horizontal legs of the side rails. Additionally, the center cross rails 16 are adapted for telescopic, releasable engagement with the cross rail segments 4 and suitable band clamps 18 are provided for locking the cross rails segments 4 and center cross rail 16 in desired adjusted relationship to provide a desired lateral width in the bedframe 1. Of course, in some instances the cross rail segments 4 may directly engage each other and be secured in adjusted relation by clamps like the clamps 18 shown herein, if no center support unit is required.

The various components of the bedframe 1 can be shipped in knocked-down condition as, for example, the caster support plates 10 can be welded to the auxiliary cross rails 13 and cross rail segments 4 and be shipped as a unit in such condition. The remaining ends of the cross rail segments and auxiliary cross rails can be bolted to the side rails 2 and 3 at the point of use of the bedframe. Of course, the clamps 18 are adjustable and are in removable engagement with the bedframe components so that they can be used to secure the cross rail means of the invention together at the point of use of the bedframe.

Figs. 4 and 5 of the drawings show a modified bedframe wherein a side rail 3a and a cross-rail 4a are provided. These side and cross rails may be secured together in any desired manner which preferably is by a means of a modified type of caster support plate 10a. This caster support plate 10a preferably is made from relatively heavy sheet metal by stamping or other forming operations. The caster support plate 10a is a quadrilateral plate which has downwardly extending edge flanges 30 and 31 provided on a pair of opposed edges thereof. Preferably the dependent leg of the cross rail 4a is secured to the flange 31 as by bolts 32 or other conventional securing means. Bolts or rivets 33 are likewise used to secure the caster support plates 10a to the lower surface of the horizontal leg of the side rail 3a. A caster 8a having a carrier plate 9a therefor is secured to the lower surface of the caster support plate 10a by rivets or other suitable means. The caster support plate 10a is of sufficiently large size as to distribute the loads supported by the side rail 3a and cross rail 4a over a relatively wide area and provide a more or less box type of engagement between the caster support means and the remainder of the bedframe.

As another feature of the invention, the side rail 3a preferably carries an end plate 34 thereon which extends laterally beyond the side rail 3a. This end plate 34 is provided with a plurality of horizontally directed slots 35 in the laterally extended portion of the side rail. The plate 34 primarily is provided for securing a bedframe to a bed headboard. Usually the bed headboards are wider than the bedframes and use of this type of an end plate provides a sturdy but simple relationship or member for securing or permitting a bedframe to be readily engaged with a bed headboard wider than the setting of the adjustable width bedframe of the invention.

By use of the novel caster support plates of the invention, relatively light weight metal angles can be used in making up the bedframes but with such bedframes being very sturdy and avoiding any bending stresses such as might distort or bend the bedframe components and render them unsuitable for further use. Thus it is contended that the objects of the invention are achieved.

While one complete embodiment of the invention has been disclosed herein, it will be appreciated that modification of this particular embodiment of the invention may be resorted to without departing from the scope of the invention as defined in the appended claims.

I claim:

1. A bedframe comprising a pair of side rails of angular shape in section and having one leg of each rail horizontally positioned, cross rail means connected to said side rails adjacent the ends thereof, caster means, plate means secured to said caster means, said plate means being secured to said cross rail means but being spaced laterally inwardly from said side rails, stubby support rails secured to said side rails and extending laterally inwardly thereof and being individually secured to said plate means to provide a solid caster positioning unit, a pair of spaced center rails of angular shape in section with upper horizontal legs at least substantially parallel to the horizontal legs of said side rails, an auxiliary cross rail secured to and extending between said center rails at each end thereof and protruding laterally therefrom, caster positioning plates wider than said center rails secured to and extending between said center rails, caster means carried by said caster positioning plates, and means for securing said auxiliary cross rails to said cross rail means.

2. In a bedframe, a pair of parallel spaced rails of angular shape in section and having one leg of each rail horizontally positioned, a caster support plate secured to and extending between said spaced rails to form a sturdy support structure therewith, a third rail secured to and extending between said pair of rails parallel to and spaced from said caster support plate, and caster means carried by said caster support plate whereby twisting and turning moments are avoided on said rails by loads from said caster support plate.

3. In a bedframe, a pair of parallel spaced rails of angular shape in section and having one leg of each rail horizontally positioned, a caster support plate wider than said rails secured to and extending between said spaced rails adjacent each end thereof to form a sturdy support structure therewith, a center cross rail secured to and extending between said rails at each end thereof and having a surface parallel to said caster support plates and extending therebeyond for engaging rail means of a bedframe, and support means secured to said caster support plates.

4. In a bedframe, an angular in section side rail, a pair of cross rail members, means securing said cross rail members to spaced portions of said side rail to extend therefrom in spaced parallel relation, a caster, and a caster support plate positioning said caster, said caster support plate being secured to and extending between said cross rail members spaced from said side rail whereby load on said bedframe is transmitted to said casters by a quadrilateral structure comprising a section of said side rail, said cross rail members and said caster plate and turning and twisting moments are at least reduced in said side rails and rail members.

References Cited in the file of this patent

UNITED STATES PATENTS

| | | |
|---|---|---|
| 223,017 | Tucker et al. | Dec. 30, 1879 |
| 755,183 | Spanjer | Mar. 22, 1904 |
| 1,686,896 | Buckert et al. | Oct. 9, 1928 |
| 2,607,051 | Jackson | Aug. 19, 1952 |
| 2,644,959 | Blanke et al. | July 14, 1953 |
| 2,676,338 | Robertson et al. | Apr. 27, 1954 |